No. 662,041. Patented Nov. 20, 1900.
W. E. SYKES.
STOVEPIPE COLLAR HOLDER.
(Application filed June 14, 1900.)
(No Model.)
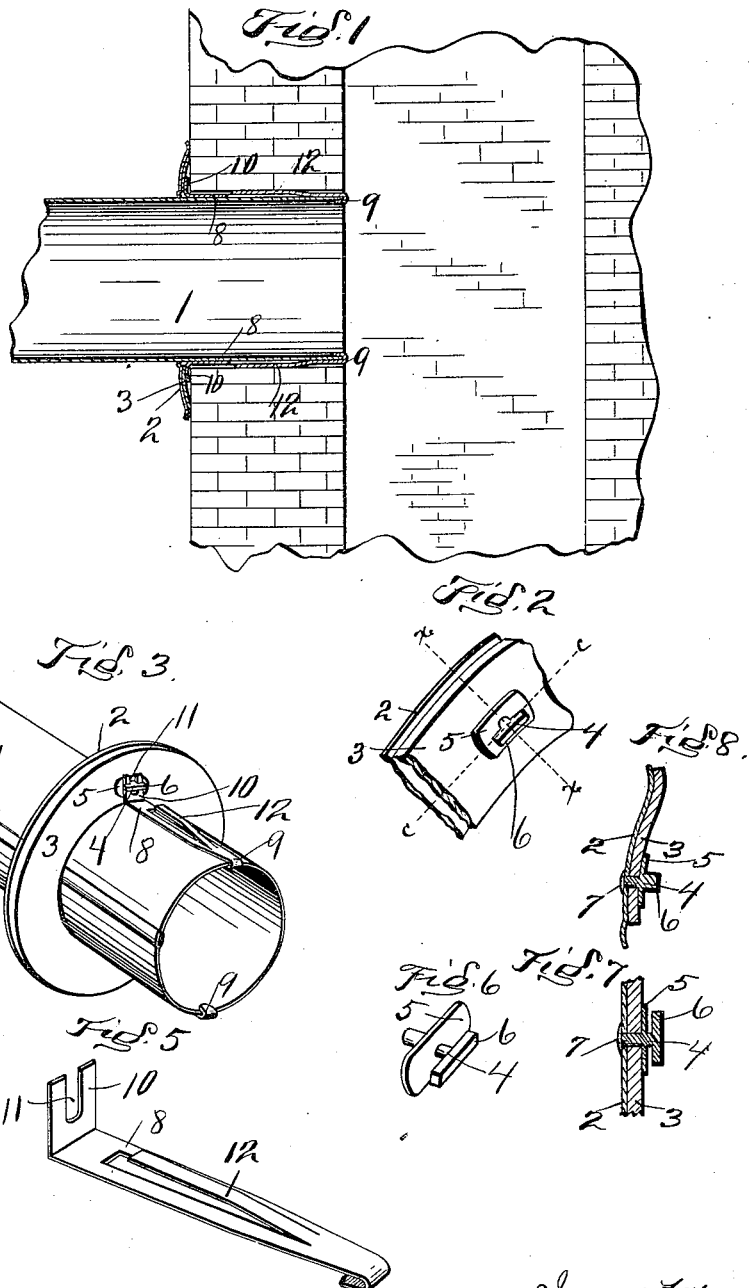

UNITED STATES PATENT OFFICE.

WILLIAM E. SYKES, OF CANAL DOVER, OHIO.

STOVEPIPE-COLLAR HOLDER.

SPECIFICATION forming part of Letters Patent No. 662,041, dated November 20, 1900.

Application filed June 14, 1900. Serial No. 20,251. (No model.)

*To all whom it may concern:*

Be it known that I, WILLIAM E. SYKES, a citizen of the United States, residing at Canal Dover, in the county of Tuscarawas and State of Ohio, have invented certain new and useful Improvements in Stovepipe-Collar Holders; and I do hereby declare that the following is a full, clear, and exact description of the same, reference being had to the annexed drawings, making a part of this specification, and to the figures of reference marked thereon, in which—

Figure 1 shows a portion of a stovepipe and the collar properly connected thereto, showing the parts in sections. Fig. 2 shows a portion of the collar, its lining, and the collar-retaining stud. Fig. 3 is a view showing a portion of a stovepipe, also the collar located thereon, and the retaining-bars properly connected. Fig. 4 is a detached view of one of the retaining-bar studs, illustrating the retaining-bar turned in proper position to be connected. Fig. 5 is a detached view of the collar-retaining bar. Fig. 6 is a detached view of the retaining-bar stud. Fig. 7 is a section on line *c c*, Fig. 2. Fig. 8 is a section on line *x x*, Fig. 2.

The present invention has relation to stovepipe-collar holders; and it consists in the different parts and combination of parts hereinafter described, and particularly pointed out in the claim.

Similar numerals of reference indicate corresponding parts in all the figures of the drawings.

In the accompanying drawings, 1 represents a portion of the stovepipe-section designed to be inserted in the chimney-flue, said section being of ordinary construction.

Upon the stovepipe 1 is located the collar 2, which collar is preferably provided with the asbestos lining 3, said lining being located upon the inner face of the collar, as illustrated in the drawings. For the purpose of providing a means for connecting the asbestos lining 3 and the collar 2 together the studs 4 are provided, which studs are ordinarily formed as illustrated in Fig. 6, and, as shown, they are provided with the plates 5 and the T-heads 6. The plates 5 being for the purpose of holding the asbestos lining 3 in proper relative position with reference to the collar 2 and for the purpose of properly connecting the studs 4 to the collar, the outer ends of the studs are swaged, thereby forming the heads 7, by which arrangement the studs are securely connected to the collar 2 and the asbestos lining connected to the collar. For the purpose of preventing the collar from moving outward when the pipe is inserted in the chimney-flue the collar-retaining bars 8 are provided, which collar-retaining bars are provided with the hooks 9 formed upon their inner ends and said hooks located over the inner end of the pipe 1. For the purpose of connecting the retaining-bars 8 to the collars their outer ends are provided with the right-angled portions 10, which right-angled portions are provided with the open notches 11, which open notches are for the purpose of allowing the right-angled portions 10 to be seated between the plate 5 and the T-head 6.

It will be understood that in order to place the retaining-bars 8 they should be turned so as to bring the right-angled portions 9 in a horizontal position (reference being had to Fig. 4) and said right-angled portions moved so as to bring them under the T-heads 6, after which the retaining-bars are brought into the position illustrated in Fig. 3 and the hooks 9 placed over the ends of the pipe, by which arrangement the collar proper is properly connected to the stovepipe.

It will be understood that after the collar 2 is placed upon the pipe before the connecting-bars 8 are connected it would be difficult to connect said bars to the T-heads of the studs, inasmuch as the pipe would come so close that the angle portion could not be placed under said T-heads; but if in the event the bars 8 are first connected to the collar and the collar and bars placed in proper relative position upon the pipe then in that event said bars need not be turned at an angle, as illustrated in Fig. 4.

For the purpose of holding the stovepipe in the chimney-flue the retaining-bars 8 are provided with the springs 12, said springs being formed from portions of the retaining-bar 8.

It will be understood that the outer ends of the spring 12 are to be free and the inner ends left integral with the retaining-bars 8, or, in other words, the springs are cut from the body of the retaining-bars 8, said retaining-bars being formed of such material that after the springs 12 have been bent outward they will assume the position illustrated in Figs. 3 and 4, by which arrangement they will hold the stovepipe in the position illustrated in Fig. 1.

Having fully described my invention, what I claim as new, and desire to secure by Letters Patent, is—

In a stovepipe-collar holder, a collar, an asbestos lining therefor, studs provided with plates and T-heads, the said studs passing through the asbestos lining and collar and being suitably fastened to the collar whereby the lining is held upon the collar by the plates on the studs, in combination with retaining-bars each bar having one end bent at right angles to the main portion thereof, said end being provided with an open slot adapted to engage a stud on the collar and the outer end bent into a hook, said main portion being provided with a spring adapted to engage with a flue-wall when the device is in its operative position, substantially as set forth.

In testimony that I claim the above I have hereunto subscribed my name in the presence of two witnesses.

WILLIAM E. SYKES.

Witnesses:
OTTO WAGNER,
CHAREL WAGNER.